(12) United States Patent
Descaillot et al.

(10) Patent No.: US 10,835,975 B2
(45) Date of Patent: Nov. 17, 2020

(54) METHOD AND DEVICE FOR IDENTIFYING A SPARK-EROSION WIRE ON A COIL, AND APPLICATION TO MACHINING BY A WIRE SPARK-EROSION MACHINE

(71) Applicant: THERMOCOMPACT, Epagny Metz-Tessy (FR)

(72) Inventors: Philippe Descaillot, Dingy Saint Clair (FR); Michel Ly, Annecy (FR); Gilles Mollard, Annecy (FR); Blanche Ouvrard, Annecy (FR)

(73) Assignee: THERMOCOMPACT, Epagny Metz-Tessy (FR)

( * ) Notice: Subject to any disclaimer, the term of this patent is extended or adjusted under 35 U.S.C. 154(b) by 131 days.

(21) Appl. No.: 15/759,294

(22) PCT Filed: Sep. 30, 2016

(86) PCT No.: PCT/IB2016/055853
§ 371 (c)(1),
(2) Date: Mar. 12, 2018

(87) PCT Pub. No.: WO2017/056045
PCT Pub. Date: Apr. 6, 2017

(65) Prior Publication Data
US 2018/0257159 A1    Sep. 13, 2018

(30) Foreign Application Priority Data
Oct. 2, 2015 (FR) ..................... 15 59408

(51) Int. Cl.
*B23H 7/20* (2006.01)
*B23H 7/10* (2006.01)
(Continued)

(52) U.S. Cl.
CPC ............ *B23H 7/20* (2013.01); *B23H 7/04* (2013.01); *B23H 7/10* (2013.01); *B23H 11/00* (2013.01);
(Continued)

(58) Field of Classification Search
CPC . B23H 7/20; B23H 7/10; B23H 11/00; B23H 7/04; B23H 2600/00
(Continued)

(56) References Cited

U.S. PATENT DOCUMENTS 4,559,433 A * 12/1985 Aramaki ............... B23H 7/102
                                                   219/69.12
4,689,457 A    8/1987 Izumiya
(Continued)

FOREIGN PATENT DOCUMENTS

| EP | 0505570 A1 | 9/1992 |
|---|---|---|
| JP | 63-169225 A | 7/1988 |
| JP | 11-179617 A | 7/1999 |

*Primary Examiner* — Thien S Tran
(74) *Attorney, Agent, or Firm* — William H. Eilberg

(57) ABSTRACT

A device for identifying a spark-erosion wire conditioned on a coil includes a radio tag, rigidly connected to the coil and accessible for reading data that it supports, identification data of the wire, supported by the radio tag, a data-reading device, associated with a wire spark-erosion machine, capable of reading the identification data supported by the radio tag of the coil, and capable of transmitting the identification data to the wire spark-erosion machine, an acquisition device for generating and recording over time as identification data, in the radio tag, historical data selected from the group that consists of historical usage data describing usage conditions of the wire supported by the coil and historical constraint data describing physical constraints to which the wire supported by the coil is subjected.

16 Claims, 2 Drawing Sheets

(51) Int. Cl.
   *B23H 11/00* (2006.01)
   *B23H 7/04* (2006.01)
(52) U.S. Cl.
   CPC .. *B23H 2600/00* (2013.01); *G05B 2219/2612* (2013.01)
(58) Field of Classification Search
   USPC .............. 219/69.12, 69.15, 702; 340/539.26, 340/572.1
   See application file for complete search history.

(56) References Cited

U.S. PATENT DOCUMENTS

| | | |
|---|---|---|
| 4,724,427 A | 2/1988 | Carroll |
| 5,453,592 A | 9/1995 | Takeuchi |
| 2004/0004113 A1* | 1/2004 | Blankenship ........ B23K 9/1062 235/375 |
| 2016/0278168 A1* | 9/2016 | Bourke, III ............ H05B 6/062 |

* cited by examiner

METHOD AND DEVICE FOR IDENTIFYING A SPARK-EROSION WIRE ON A COIL, AND APPLICATION TO MACHINING BY A WIRE SPARK-EROSION MACHINE

TECHNICAL FIELD OF THE INVENTION

The present invention concerns wire spark-erosion machining devices, in which a continuous metal wire of small diameter, paid out from a spool on which it is packaged, passes through a machining zone filled with an appropriate dielectric in a spark-erosion machine. In the machining zone, a length of the wire is held by guides in the vicinity of a part to be machined that is itself electrically conductive. An electrical current generator is connected between the wire and the part to be machined, producing electrical arcs between the wire and the part to be machined. The electrical arcs cause wear of the wire and of the part. To compensate the wear of the wire, the latter is moved continuously in its longitudinal direction in the machining zone. Following the wear produced on the part, the wire is progressively moved toward the part by the spark-erosion machine, thus producing a cut on the part to be machined by removal of material.

The effectiveness of the removal of material on the part to be machined depends on numerous parameters, and in particular: the electrical power delivered by the electrical current generator, the electrical power that the wire can withstand during machining without breaking, the speed of longitudinal movement of the wire, the structure of the wire itself, the mechanical tension that the wire can withstand without breaking, the agitation of the dielectric in the machining zone, the ease of introduction of the wire into the machining zone and into the guides of the spark-erosion machine at the start of machining.

Depending on these parameters, the removal of material from the part to be machined can be more or less rapid, characterized by a machining speed or speed of penetration of the wire into the part to be machined.

Depending on these parameters, the machining produced can be more or less precise, characterized by a precision of the cut produced on the part, also characterized by a surface state of the cut faces of the part produced in this way.

A great number of these parameters that characterize the quality and the effectiveness of spark-erosion machining determined by the wire itself, in terms of its shape, its structure, its composition, its properties.

One difficulty, in the implementation of a wire spark-erosion machining process, resides in the appropriate choice of the machining parameters that have to be entered into the program of the spark-erosion machine. In fact, not all spark-erosion wires have the same properties, and this necessitates major adaptation of the program of the spark-erosion machine to each type of spark-erosion wire, and even to each spool of a particular type of spark-erosion wire.

The operator must therefore get information on the nature, the quantity and the qualities of the spark-erosion wire packaged on the spool that they load onto the spark-erosion machine at the start of machining, and must then enter this information into the program of the spark-erosion machine, and must choose the parameters of the program according to the machining results that they expect to obtain and as a function of limits determined by Lire properties of the spark-erosion wire.

The risks of errors in the choice of machining parameters are relatively high, all the more so in that some data is generally missing concerning the wire, notably historical data specific to each spool of wire.

SUMMARY OF THE INVENTION

The present invention in particular aims to propose means making it possible to facilitate, to complete and to make secure the identification of a spark-erosion wire carried by a spool, in order for the choice of the machining parameters in a wire spark-erosion machine then to be able to take the best possible account of the spark-erosion capacities of the wire packaged on a spool.

The present invention also aims to propose means enabling more complete and safer automation of the adaptation of the spark-erosion parameters in a wire spark-erosion machine as a function of the capacities specific to each spark-erosion wire used.

To achieve the above and other aims, in accordance with a first aspect, the invention proposes a device for identifying a spark-erosion wire packaged on a spool, comprising:
  an identification data medium, fastened to the spool and accessible for reading identification data that it carries,
  identification data or said wire, carried by the identification data medium,
and in which:
  the identification data medium is an RFID tag, able to communicate with a data reader device associated with a wire spark-erosion machine for reading and writing the identification data carried by the identification data medium of the spool,
  the identification data carried by the identification data medium comprises historical data chosen from the group consisting of use historical data describing earlier use conditions of the spark-erosion wire carried by the spool and stress historical data describing physical stresses to which the spark-erosion wire carried by the spool has previously been subjected.

An RFID tag identification data medium of this kind can contain a large quantity of data, a quantity that is satisfactory for all of the parameters enabling effective characterization of the spark-erosion wire and enabling an appropriate choice of the spark-erosion parameters of the spark-erosion machine. An identification data medium of this kind further includes a memory of sufficient size to receive and to store, at any time and throughout the intended service life of the spark-erosion wire, historical data added on the fly to the initial data stored during the manufacture of the spool of wire.

It is clear that the characteristics of the wire, determining its spark-erosion capacity, can therefore be updated continuously or periodically, and transmitted to the spark-erosion machine, so that the operator can therefore obtain, in the spark-erosion machine, the necessary information enabling them to choose the most appropriate machining parameters according to their requirements.

Alternatively, the program, implemented in the spark-erosion machine can download and use automatically the identification data received from the identification data medium via the data reader device to contribute to the choice of the machining parameters.

In practise, the identification data of the wire can comprise use historical data and/or stress historical data, together with some or all of the initial information such as:
  the type of wire,
  the diameter of the wire,
  the annealing status of the wire, the length or the weight of wire initially available on the spool, the machining technology to be used on the spark-erosion machine, defined by the name of the technology or the parameters to be used for machining, the maximum clearance angle recommended for the wire, the possible surface state to be produced with the wire, the preferred spraying conditions for machining with the wire, the intended rate of erosion during machining with the wire using the technology to be employed.

According to one advantageous embodiment, the identification device is such that:

it further comprises a data reader device, associated with a wire spark-erosion machine, able to read the identification data carried by the identification data medium of the spool, and able to transmit the identification data to the wire spark-erosion machine, the data reader device is a radio-frequency communication device able to communicate with the RFID tag.

The identification device preferably comprises acquisition means, implemented in the spark-erosion machine, for sending and storing on the fly in the RFID tag, via the radio-frequency communication device, use historical data describing the conditions of use of the spark-erosion wire by said spark-erosion machine.

Instead of this or in addition to this, the RFID tag can be of the active or semi-active type, provided with an onboard electrical power supply and associated with onboard sensors and storage means for scrutinizing and storing the signals produced by the onboard sensors, said signals constituting stress his data describing the physical stresses to which the spark-erosion wire carried by the spool is subjected.

In practise, said use historical data can comprise historical data from the following group:

length or weight of wire already consumed, threading or machining alarms encountered previously with the wire carried by the spool, machining programs, machining technologies and parameters employed previously during spark-erosion machining with the wire carried by the spool, nature of the parts machined previously with the wire carried by the spool, height of the parts machined previously with the wire carried by the spool, dates and durations of machining effected previously with the wire carried by the spool, machining passes effected previously With the wire carried by the spool.

Similarly, said stress historical data can comprise information from the following group:

accelerations of the spool carrying the wire, coming from an onboard accelerometer on the RFID tag or on the spool, ambient temperature encountered by the spool carrying the wire, coming from an onboard temperature sensor on the RFID tag or on the spool, relative humidity encountered by the spool carrying the wire, coming from an onboard humidity sensor on the RFID tad or on the spool, length or weight of wire already consumed.

This stress historical information can be useful for monitoring the ongoing good quality of the spark-erosion wire from its production in the factory to the site of use by the spark-erosion machine. This complementary information can be used by the spark-erosion machine to generate an alarm, or to reject the wire, or to adapt the machining parameters as a function of any modifications to which the wire was subjected before the machining step.

Thanks to the accelerometer, it is possible to know the precise quantity of wire remaining on the spool. To this end, the RFID tag can comprise a processor electronic circuit including means for computing the number of revolutions effected by the spool about its axis as a function of the acceleration signals received from the accelerometer. In principle each reversal +g/−g of acceleration corresponds to a half-revolution of the spool. This number of revolutions is representative of the consumption of the wire in the spark-erosion machine (because it is rare for a package of spools of wire to rotate during transportation thereof).

If the tag includes a clock, the date of the last revolution of the spool (representing its last use) can also be stored.

The precise number of turns of wire initially present on the spool can be recorded during the manufacture thereof or just afterwards (by reading off the turns count of the winder of the production machine).

According to another aspect, to achieve the above and other aims, the present invention proposes a method of identifying a spark-erosion wire packaged on a spool including an identification data medium carrying identification data of said wire, in which method there is stored on the fly by way of identification data, in the identification data medium, historical data chosen from the group consisting in use historical data describing conditions of use of the wire carried by the spool and stress historical data describing physical stresses to which the wire carried by the spool is subjected.

In practise, in an identification method of this kind, the use historical data can comprise historical data from the following group:

length or weight of wire already consumed, threading or machining alarms encountered previously with the wire carried by the spool, machining programs, machining technologies and parameters employed previously during spark-erosion machining with the wire carried by the spool, nature of the parts machined previously with the wire carried by the spool, height of the parts machined previously with the wire carried by the spool, dates and durations of machining effected previously with the wire carried by the spool, machining passes effected previously with the wire carried by the spool.

Similarly, in an identification method of this kind, the stress historical data can comprise information from the following group:

accelerations of the spool carrying the wire, coming from an onboard accelerometer on the RFID tag or on the spool, ambient temperature encountered by the spool carrying the wire, coming from an onboard temperature sensor on the RFID tag or on the spool, relative humidity encountered by the spool carrying the wire, coming from an onboard humidity sensor on the RFID tag or on the spool, length or weight of wire already consumed.

According to another aspect, to achieve the above and other aims, the present invention proposes a spark-erosion machining device, comprising:

a wire spark-erosion machine, a spark-erosion wire packaged on a spool, an identification data medium fastened to the spool and accessible for reading data that it carries, identification data of said wire, carried by the identification data medium, a data reader device, associated with the wire spark-erosion machine, able to read the identification data carried by the identification data medium of the spool, and able to transmit the identification data to the wire spark-erosion machine, in which:

the identification data medium is an RFID tag, the data reader device is a radio-frequency communication device able to communicate with the RFID tag, the machining device comprises acquisition means for generating and storing on the fly by way of identification data, in the identification data medium, historical data chosen from the group consisting of use historical data describing conditions of use of the wire carried by the spool and stress historical data describing physical stresses to which the wire carried by the spool is subjected.

In practise, in this kind of spark-erosion machining device, the acquisition means comprise a control circuit of the wire spark-erosion machine and a stored computer program executed by said control circuit and comprising an acquisition sequence which generates, transmits and stores on the fly, in the identification data medium, some or all of the historical data on use of the wire by the wire spark-erosion machine, said use historical data of the wire being chosen from the group consisting of:

length or weight of wire consumed by the wire spark-erosion machine, threading or machining alarms encountered by the wire spark-erosion machine with the wire, carried by the spool, machining programs, machining technologies and parameters employed by the wire spark-erosion machine with the wire carried by the spool, nature of the parts machined by the wire spark-erosion machine with the wire carried by the spool, height of the parts machined by the wire spark-erosion machine with the wire carried by the spool, dates and durations of the machining effected by the wire spark-erosion machine with the wire carried by a spool, machining passes effected by the wire spark-erosion machine with the wire carried by the spool.

Instead of this or in addition to this, in a spark-erosion machining device of this kind, the RFID tag can advantageously be of active or semi-active type, provided with an onboard electrical power supply, and associated with onboard sensors and storage means for scrutinizing and storing signals produced by the onboard sensors, said signals constituting stress historical data comprising information chosen from the group consisting of:

accelerations of the spool carrying the wire, coming from an onboard accelerometer on the RFID tag or on the spool, ambient temperature encountered by the spool carrying the wire, coming from an onboard temperature sensor on the RFID tag or on the spool, relative humidity encountered by the spool carrying the wire, coming from an onboard humidity sensor on the RFID tag or on the spool, length or weight of wire already consumed.

According to another aspect, to achieve the above and other aims, the present invention proposes a method of machining by spark-erosion on a wire spark-erosion machine by means of a spark-erosion wire packaged on a spool provided with an identification data medium carrying identification data of said wire, in which method:

there is stored on the fly by way of identification data, in the identification data medium, historical data chosen from the group consisting of use historical data describing current conditions of use of the wire carried by the spool and stress historical data describing physical stresses to which the wire carried by the spool is subjected, the identification data contained in the identification data medium is transferred to the wire spark-erosion machine, the machining parameters are adapted taking into account in particular identification data coming from the identification data medium of the spool used for the machining.

In practise, in a spark-erosion machining process of this kind, the use historical data can comprise historical data from the group consisting of:

length or weight of wire already consumed, threading or machining alarms encountered previously with the wire carried by the spool, machining programs, machining technologies and parameters employed previously during machining by spark-erosion with the wire carried by the spool, nature of the parts machined previously with the wire carried by the spool, height of the parts machined previously with the wire carried by the spool, dates and durations of the machining effected previously with the wire carried by spool, machining passes effected previously with the wire carried by the spool.

Similarly, in a spark-erosion machining process of this kind, the stress historical data can comprise information from the group consisting of:

accelerations of the spool carrying the wire, coming from an onboard accelerometer on the RFID tag or on the spool, ambient temperature encountered by the spool carrying the wire, coming from an onboard temperature sensor on the RFID tag or on the spool, relative humidity encountered by the spool carrying the wire, coming from an onboard humidity sensor on the RFID tag or on the spool, length or weight of wire already consumed.

For example, the sequence of downloading identification data can comprise the downloading of at least the length of the wire present on the spool, and the computer program of the spark-erosion machine can usefully comprise a sequence comparing the length of wire present on the spool to the length of wire required for the execution of the current machining program. The computer program can then provide the expected date and time of the next change of the soon to be empty spool for another, so that the operator is informed in advance. The computer program can also generate where appropriate an alarm to warn of the necessity for a next change of spool, and possibly interrupt the machining process pending the spool change. Alternatively, the computer program can refuse to start the machining if the remaining quantity of wire is insufficient.

The machining method as defined above can also advantageously comprise a sequence generating an alarm detectable by an operator, said alarm generation sequence making it possible to generate an alarm when the machining conditions programmed in the machining to be effected conforms to machining conditions stored in the identification data medium that previously resulted in defective machining using the same spark-erosion wire.

This therefore avoids reproducing defective machining leading to the rejection of the machined parts and necessitating subsequent modification of the machining parameters to adapt to the wires it is wished so use. This also prevents continued use of a defective or inappropriate wire to effect the required machining.

It is for the identification data medium to contain in particular the identity of the manufacturer of the wire, the coordinates of the manufacturer of the wire, and the serial number of the spool. In practise, the acquisition sequence can then comprise the acquisition of at least the identity of the manufacturer of the wire, their coordinates and the serial number of the spool, and the acquisition sequence can comprise a sequence automatically downloading data relating to the spool of wire from a computer server of the manufacturer.

It is therefore possible to give preference to using data supplied on an ongoing basis by the manufacturer, which can be more complete and more reliable than the data present in the identification data medium at the date of manufacture of the wire.

In the spark-erosion machining method according to the invention, it can be advantageous for the identification data relating to the spool of wire to comprise in particular the particular machining parameters that have to be adopted to optimize machining with said spool of wire.

BRIEF DESCRIPTION OF THE DRAWINGS

Other aims, features and advantages of the present invention will emerge from the following description of particular embodiments given with reference to the appended figures, in which.

DESCRIPTION OF PREFERRED EMBODIMENTS

Figure 1:
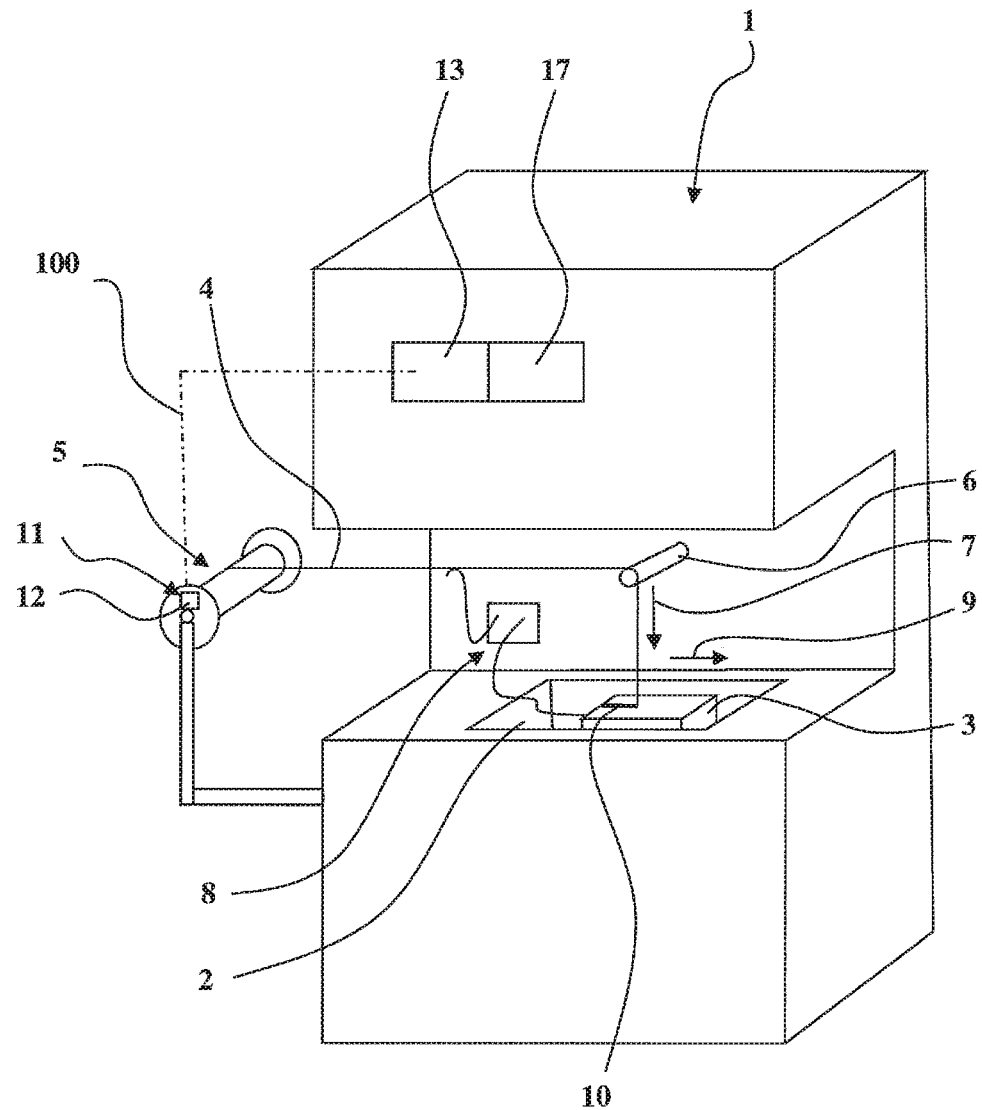
FIG. 1 is a diagram showing a spark-erosion machine that is machining a part by means of a wire packaged on a spool according to one embodiment of the present invention.

Consider first of all FIG. 1, showing a wire spark-erosion machining device according to one embodiment of the present invention.

Generally speaking, the machining device comprises a wire spark-erosion machine 1 in which there is a machining zone 2 filled with an appropriate liquid dielectric. The machining zone 2 is conformed and structured to receive and to hold a part 3 to be machined. A spark-erosion wire 4, packaged on a spool 5, is paid out from the spool 5 and passes over guides 6 of the spark-erosion machine 1 that hold it in position and drive it in longitudinal movement as shown by the arrow 7. The spark-erosion wire 4 passes through the machining zone 2, in which it is held in the vicinity of the part 3 to be machined.

The wire spark-erosion machine 1 further includes an electrical current generator 8, connected between the spark-erosion wire 4 and the part 3 to be machined, to produce electrical arcs between the spark-erosion wire 4 and the part 3 to be machined.

In operation, the electrical arcs cause wear of the spark-erosion wire 4 and of the part 3 to be machined. The continuous longitudinal movement 7 of the spark-erosion wire 4 in the machining zone 2 makes it possible to prevent rupture of the spark-erosion wire 4 because of the wear caused by the electrical arcs on the wire. On the other hand, the wear caused on the part 3 by the electrical arcs constitutes a removal of material that makes it possible, by progressive relative movement of the spark-erosion wire 4 toward the part 3, for example as shown by the arrow 9, to make a cut 10 on the part 3 to be machined.

In the machining zone 2, the spark-erosion wire 4 must be tensioned by longitudinal mechanical traction effected by the guides 6, in order to preserve a defined and stable geometrical position that guarantees good geometry of the cut 10 made on the part 3 to be machined.

At the start of machining, it is necessary to introduce the free end of the spark-erosion wire 4 into the guides 6 and into the machining zone 2. Generally speaking, the spark-erosion machine 1 comprises a sequence of operations providing automatic introduction of the wire. However, this necessitates that the spark-erosion wire 4 has satisfactory properties of straightness and stiffness so that its free end can be guided when the guides 6 hold the wire only by intermediate sections away from the free end of the wire.

According to the invention, the machining device further comprises a device for identifying the spark-erosion wire 4 packaged on the spool 5.

This identification device comprises in particular an identification data medium 11 fastened to the spool 5 and identification data 12 of the wire carried by the identification data medium 11.

The identification data medium 11 cooperates with a data reader device 13 associated with the wire spark-erosion machine 1, via a wireless link 100 enabling communication between the identification data medium 11 and the data reader device 13.

Figure 2:
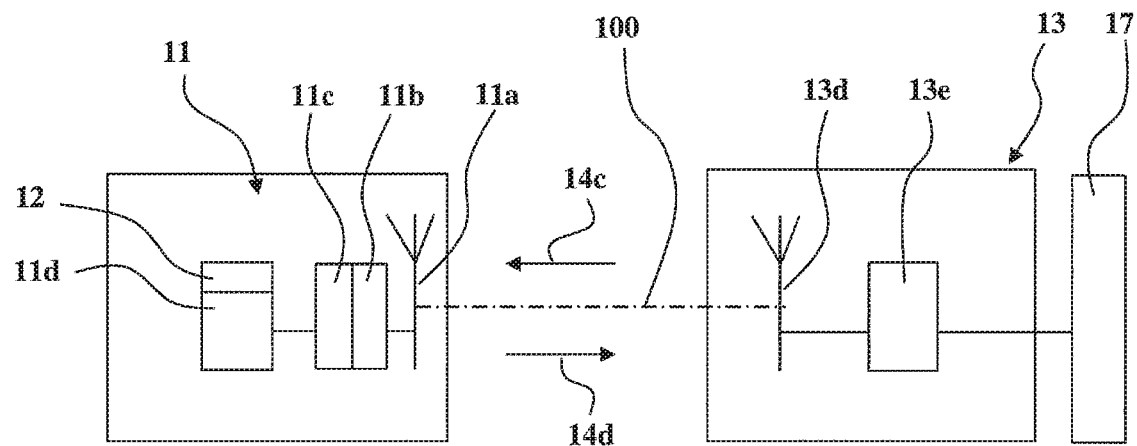
FIG. 2 is a diagram showing a passive RFID tag type identification data medium according to a first embodiment of the present invention communicating by radio with a data reader device associated with or implemented in a spark-erosion machine.
Figure 3:
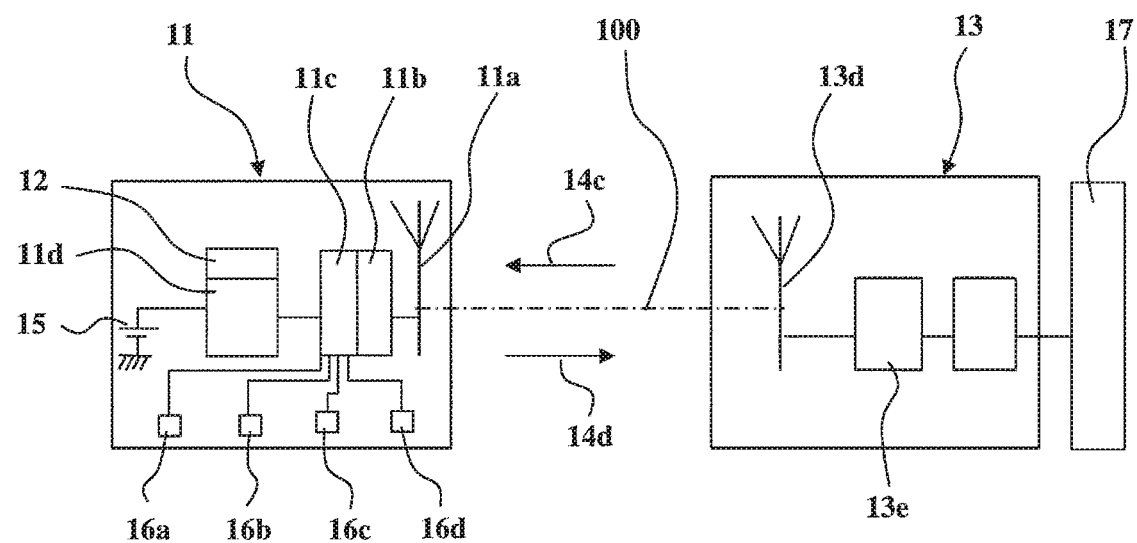
FIG. 3 is a diagram showing an active or semi-active RFID tag type identification data medium according to a second embodiment of the present invention communicating by radio with a data reader device associated with or implemented in a spark-erosion machine.

FIGS. 2 and 3 show, by way of example, two embodiments of the identification device according to the invention.

In FIG. 2, the identification data medium 11 is a passive RFID tag, comprising an antenna 11a, a power supply circuit 11b able to use some of the electrical energy captured by the antenna 11a to generate a power supply voltage powering the other electronic circuits of the RFID tag. A processor electronic circuit 11c receives the request electronic signals 14c captured by the antenna 11a, communicates with a storage circuit 11d containing the identification data 12, and, as a function of the request electronic signals 14c, generates response electronic signals 14d that it transmits via the antenna 11a. For example, on reception of request electronic signals 14c requesting the communication of an identification, the passive RFID tag returns response signals 14d containing said identification extracted from the identification data 12 of the wire.

In this case, the data reader device 13 is an active device, emitting radio frequencies that enable remote activation of the RFID tag 11. It comprises an antenna 13d and an electronic circuit 13e enabling on the one hand generation of the request signals 14c to be transmitted via the antenna 13d to the RFID tag 11 and on the other hand to process the response signals 14d received from the RFID tag 11 and captured by the antenna 13d. The wireless link 100 is a radio link.

One RFID tag and data reader device embodiment is described in the document U.S. Pat. No. 4,724,427.

In FIG. 3 the identification data medium 11 is an active or semi-active RFID tag, in which there are found again the principal elements of the FIG. 2 embodiment, and in particular: an antenna 11a, a power supply circuit 11b, a processor electronic circuit 11c, a storage circuit 11d, having the same functions as those of the FIG. 2 embodiment. In FIG. 3, the identification data medium 11 further comprises an onboard electrical power supply able to supply electrical energy to the processor electronic circuit 11c and the storage electronic circuit 11d instead of or in addition to the electrical energy captured by the antenna 11a.

In this case, the identification data medium 11 further comprises onboard sensors, for example four onboard sensors 16a, 16b, 16c, 16d respectively supplying to the processor electronic circuit 11c signals imaging the acceleration of the carrying the wire 4 and the identification data medium 11, signals imaging the ambient temperature, signals imaging the ambient relative humidity, signals imaging the weight of the spool 5.

The processor electronic circuit 11c is controlled by a program including a storage sequence for scrutinizing and storing, in the storage circuit 11d, the signals produced by the onboard sensors 16a, 16b, 16c and 16d.

The program of the processor electronic circuit 11c can advantageously include a number of revolutions computation sequence, for computing the number of revolutions of the spool 5 around its axis as a function of the signals imaging the accelerations of the spool 5, those signals being received from an accelerometer type onboard sensor 16a.

In this FIG. 3 embodiment, the data reader device 13 is also an active device emitting radio frequencies that where applicable make it possible to activate remotely the RFID tag 11, and comprising an antenna 13d and an electronic circuit 13e for on the one hand generating request signals 14c sent to the RFID tag 11 and on the other hand processing the response signals 14d received from the RFID tag 11 and captured by the antenna 13d. The wireless link 100 is a radio link.

Referring again to FIG. 1, the control circuit 17 of the spark-erosion machine 1 includes a computer program.

The computer program of the control circuit 17 of the spark-erosion machine 1 comprises at least one acquisition sequence for generating and storing on the fly by way of identification data 12, in the identification data medium 11, historical data chosen from the group consisting of use historical data describing conditions of use of the spark-erosion wire 4 carried by the spool 5 and stress historical data describing physical stresses to which the spark-erosion wire 4 carried by the spool 5 is subjected.

The use historical data is in principle generated in the wire spark-erosion machine 1, and sent in the form of messages 14c to the identification data medium 11.

The stress historical data is in principle generated by the sensors 16a, 16b, 16c and 16d associated with the identification data medium 11.

The computer program of the control circuit 17 of the spark-erosion machine 1 comprises at least one sequence for downloading some or all of the identification data 12 carried by the identification data medium 11. The downloading sequence controls the data reader device 13 so that it generates request signals 14c and sends them no the identification data medium 11, which then sends back to it in the form of messages 14d some or all of the identification data 12 which, after reception by the data reader device 13, is introduced into the control circuit 17 of the spark-erosion machine 1.

The computer program of the control circuit 17 of the spark-erosion machine 1 comprises at least one sequence for adaptation of the machining parameters, taking into account in particular identification data 12 coming from the identification data medium 11 of the spool 5 used for the machining. As a result, the device according no the invention enables automation of the adaptation of the spark-erosion parameters in the wire spark-erosion machine 1 as a function of the inherent capacities of the spark-erosion wire 4 used. For example, the adaptation sequence can modify or limit parameters comprising the mechanical tension in the spark-erosion wire 4 in the machining zone 2, the electrical current in the spark-erosion wire 4 in the machining zone 2, the speed of longitudinal movement 7 of the spark-erosion wire 4 in the machining zone 2, the agitation of the dielectric in the machining zone 2, the transverse movement 9 of the spark-erosion wire 4 in the machining zone 2.

Additionally, the adaptation sequence can include a sequence for generation of alarms detectable by an operator, by which an alarm is generated when the machining conditions programmed by the operator conform to machining conditions stored in the identification data medium 11 and having previously caused defective machining using the same spark-erosion wire 4.

The data relating to the spark-erosion wire 4 can be downloaded directly, merely by interrogation of the identification data medium 11 if the latter contains ail of the necessary data.

Alternatively, the downloading of the data can be in part indirect, the downloading sequence then comprising the downloading of at least the identity of the manufacturer of the wire 4 and the number of the spool 5 by interrogation of the identification data support 11, and a sequence for automatic downloading of data relating to the spool 5 of wire 4 from a computer server of the manufacturer by interrogating the computer server of the manufacturer via the Internet using information on the identity of the manufacturer of the wire 4 and the serial number of the spool 5.

In operation, the computer program of the spark erosion machine 1 therefore enables use of a wire spark-erosion machining method in which some or all of the identification data 12 of the wire 4 is downloaded from an identification data medium 11 carried by the spool 5 on which the spark-erosion wire 4 used for the machining method is packaged. The identification data 12 is, then used by the computer program of the spark erosion machine 1 to adapt the machining parameters taking account of the identification data 12.

The present invention is not limited to the embodiments that have been explicitly described, but includes the various variants and generalizations thereof within the scope of the following claims.

The invention claimed is:

1. A device for identifying a spark-erosion wire packaged on a spool, comprising:
an RFID tag, fastened to the spool and accessible for reading identification data that the RFID tag carries, identification data of said wire, carried by the RFID tag, and including a number of turns of wire initially present on the spool,
an onboard accelerometer on the RFID tag or on the spool, wherein:
the RFID tag is configured to communicate with a data reader device associated with a wire spark-erosion machine for reading and writing the identification data carried by the RFID tag of the spool,
the RFID tag is of an active or semi-active type, provided with an onboard electrical power supply and an onboard storage circuit to receive and to store said identification data,
the RFID tag comprises a processor electronic circuit controlled by a program,
said program includes a storage sequence for scrutinizing and storing, in the storage circuit, signals produced by the onboard accelerometer on the RFID tag or on the spool,
said program includes a number of revolutions computation sequence, for computing a number of turns effected by the spool about its axis as a function of acceleration signals received from the onboard accelerometer, and for computing a quantity of wire remaining on the spool as a function of said computed number of turns.

2. The device as claimed in claim 1 for identifying a spark-erosion wire packaged on a spool, wherein:
the RFID tag is associated with onboard ambient temperature or humidity sensors,
said program includes a storage sequence for scrutinizing and storing, in the storage circuit, signals produced by the onboard temperature or humidity sensors, said signals constituting stress historical data describing the physical stresses to which the spark-erosion wire carried by the spool is subjected.

3. The device as claimed in claim 1 for identifying a spark-erosion wire packaged on a spool, wherein
the device further comprises a data reader device, associated with a wire spark-erosion machine, configured to read the identification data carried by the RFID tag of the spool, and configured to transmit the identification data to the wire spark-erosion machine,
the data reader device is a radio-frequency communication device configured to communicate with the RFID tag.

4. The device as claimed in claim 1 for identifying a spark-erosion wire packaged on a spool, wherein:
the spark-erosion machine comprises a control circuit including a computer program,
the computer program comprises at least one acquisition sequence for generating and storing on the fly in the RFID tag, via a radio-frequency communication device, use historical data describing conditions of use of the spark erosion wire by said spark-erosion machine.

5. The device as claimed in claim 1, for identifying a spark-erosion wire packaged on a spool, wherein the identification data comprises threading or machining alarms encountered previously with the wire carried by the spool.

6. The device as claimed in claim 1, for identifying a spark-erosion wire packaged on a spool, wherein the identification data comprises nature or height of the parts machined previously with the wire carried by the spool.

7. A method of identifying a spark-erosion wire packaged on a spool including an RFID tag carrying identification data of said wire and associated with an onboard accelerometer on the RFID tag or on the spool, including:
scrutinizing and storing, in the RFID tag, signals produced by the onboard accelerometer on the RFID tag or on the spool,
computing, in the RFID tag, a number of turns effected by the spool about its axis as a function of acceleration signals received from the onboard accelerometer, and computing a quantity of wire remaining on the spool.

8. The method as claimed in claim 7 for identifying a spark-erosion wire packaged on a spool, wherein the RFID tag carrying identification data of said wire is associated with onboard ambient temperature or humidity sensors, said method including scrutinizing and storing, in the RFID tag, signals produced by the onboard ambient temperature or humidity sensors on the RFID tag.

9. The method as claimed in claim 7 for identifying a spark-erosion wire packaged on a spool, wherein:
the spool including the RFID tag carrying identification data is associated with a spark-erosion machine,
the method includes generating and storing on the fly in the RFID tag, from said spark-erosion machine, use historical data describing conditions of use of the spark erosion wire by said spark-erosion machine.

10. A spark-erosion machining device, comprising:
a wire spark-erosion machine,
a spark-erosion wire packaged on a spool,
an RFID tag, fastened to the spool and accessible for reading identification data that the RFID tag carries,
identification data of said wire, carried by the RFID tag,
an onboard accelerometer on the RFID tag or on the spool,
a data reader device, associated with the wire spark-erosion machine, configured to read the identification data carried by the RFID tag of the spool, and configured to transmit the identification data to the wire spark-erosion machine,
the RFID tag is of an active or semi-active type, provided with an onboard electrical power supply and a storage circuit to receive and to store said identification data,
the RFID tag comprises a processor electronic circuit controlled by a program,
said program includes a storage sequence for scrutinizing and storing, in the storage circuit, signals produced by the onboard accelerometer on the RFID tag or on the spool,
said program includes a number of revolutions computation sequence, for computing a number of turns effected by the spool about its axis as a function of acceleration signals received from the onboard accelerometer, and for computing a quantity of wire remaining on the spool.

11. The spark-erosion machining device of claim 10, further comprising onboard ambient temperature or humidity sensors, said program including scrutinizing and storing, in the RFID tag, signals produced by the onboard ambient temperature or humidity sensors on the RFID tag.

12. The spark-erosion machining device of claim 10, configured to execute a stored computer program comprising an acquisition sequence which generates, transmits and stores on the fly, in the RFID tag, historical data on use of the wire by the wire spark-erosion machine, said use historical data of the wire including threading or machining alarms encountered by the wire spark-erosion machine with the wire carried by the spool.

13. The spark-erosion machining device of claim 10, configured to execute a stored computer program comprising an acquisition sequence which generates, transmits and stores on the fly, in the RFID tag, historical data on use of the wire by the wire spark-erosion machine, said use historical data of the wire including nature or height of the parts machined by the wire spark-erosion machine with the wire carried by the spool.

14. A method of machining by spark erosion on a wire spark-erosion machine by means of a spark-erosion wire packaged on a spool including an RFID tag carrying identification data of said wire and associated with an onboard accelerometer on the RFID tag or on the spool, the method including:
  scrutinizing and storing, in the RFID tag, signals produced by the onboard accelerometer on the RFID tag or on the spool,
  computing, in the RFID tag, a number of turns effected by the spool about its axis as a function of acceleration signals received from the onboard accelerometer, and computing a quantity of wire remaining on the spool.

15. The method according to claim 14 of machining by spark erosion on a wire spark-erosion machine by means of a spark-erosion wire packaged on a spool including an RFID tag carrying identification data of said wire, said RFID tag been associated with onboard ambient temperature or humidity sensors on the RFID tag, the method including:
  scrutinizing and storing, in the RFID tag, signals produced by the onboard ambient temperature or humidity sensors on the RFID tag or on the spool.

16. The method according to claim 14 of machining by spark erosion on a wire spark-erosion machine by means of a spark-erosion wire packaged on a spool including an RFID tag carrying identification data of said wire, the method including:
  downloading, into the wire spark-erosion machine, identification data contained in the RFID tag,
  adapting machining parameters of the spark-erosion machine depending on identification data downloaded from the RFID tag of the spool used for the machining.

* * * * *

UNITED STATES PATENT AND TRADEMARK OFFICE
CERTIFICATE OF CORRECTION

PATENT NO. : 10,835,975 B2  
APPLICATION NO. : 15/759294  
DATED : November 17, 2020  
INVENTOR(S) : Philippe Descaillot et al.

Page 1 of 1

It is certified that error appears in the above-identified patent and that said Letters Patent is hereby corrected as shown below:

In the Specification

In Column 1, Line 47, delete "determined" and insert instead --are determined--.

In Column 2, Line 24, delete "data or said wire" and insert instead --data of said wire--.

In Column 3, Line 32, delete "stress his data" and insert instead --stress historical data--; in Line 48, delete "With the wire" and insert instead --with the wire--; in Line 60, delete "RFID tad" and insert instead --RFID tag--.

In Column 7, Line 6, delete "wished so" and insert instead --wished to--; in Line 9, delete "It is for" and insert instead --It is advantageous for--.

In Column 9, Line 13, delete "power supply able" and insert instead --power supply 15 able--; in Line 20, delete "of the carrying" and insert instead --of the spool 5 carrying--.

In Column 10, Line 10, delete "according no the" and insert instead --according to the--; in Line 31, delete "ail" and insert instead --all--; in Line 36, delete "and the number" and insert instead --and the serial number--; in Line 43, delete "spark erosion" and insert instead --spark-erosion--; in Line 49, delete the "," after "is".

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*